(12) United States Patent
Ishikawa et al.

(10) Patent No.: US 7,237,638 B2
(45) Date of Patent: Jul. 3, 2007

(54) V-BELT TYPE CONTINUOUSLY VARIABLE TRANSMISSION

(75) Inventors: Hideo Ishikawa, Wako (JP); Kenji Oki, Wako (JP); Michio Asumi, Wako (JP); Fuminori Kamemizu, Wako (JP); Hirokazu Komuro, Wako (JP); Junichi Sakamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 218 days.

(21) Appl. No.: 10/926,987

(22) Filed: Aug. 27, 2004

(65) Prior Publication Data
US 2005/0109554 A1    May 26, 2005

(30) Foreign Application Priority Data

| Sep. 30, 2003 | (JP) | ............................. 2003-342367 |
| Oct. 10, 2003 | (JP) | ............................. 2003-352965 |

(51) Int. Cl.
*F16H 7/22* (2006.01)
*B62D 61/02* (2006.01)

(52) U.S. Cl. ........................ 180/219; 474/108; 474/23; 474/26; 74/606 R (58) Field of Classification Search .............. 180/219; 474/108, 23, 26; 74/606 R
See application file for complete search history.

(56) References Cited

U.S. PATENT DOCUMENTS

| 6,547,024 B2 * | 4/2003 | Ohyama et al. ............ 180/227 |
| 6,666,290 B2 * | 12/2003 | Yamauchi .................. 180/68.1 |
| 2002/0027032 A1 * | 3/2002 | Tsutsumikoshi ............ 180/219 |
| 2002/0027033 A1 * | 3/2002 | Minami et al. ............. 180/225 |
| 2003/0232673 A1 * | 12/2003 | Liao et al. ...................... 474/8 |
| 2004/0102267 A1 * | 5/2004 | Murakami et al. ............ 474/69 |
| 2005/0079937 A1 * | 4/2005 | Heide .......................... 474/14 |
| 2006/0065458 A1 * | 3/2006 | Wachigai et al. ........... 180/219 |

FOREIGN PATENT DOCUMENTS

| JP | 5-44827 A | 2/1993 |
| JP | 2001-106158 A | 4/2001 |

* cited by examiner

*Primary Examiner*—Lesley D. Morris
*Assistant Examiner*—Marlon Arce-Diaz
(74) *Attorney, Agent, or Firm*—Birch, Stewart, Kolasch & Birch, LLP

(57) ABSTRACT

A belt continuously variable transmission apparatus having a case which includes a power transmission case (which is part of a crankcase of an engine), a power transmission case cover, and an actuator cover assembled forwardly of the power transmission case cover (displaced forwardly on a vehicle body). The actuator cover is formed as a separate member from the power transmission case cover, and supports a motor for driving a movable part of a driving pulley. In addition, the actuator cover covers a gear system. The actuator cover is integrated with a cover of the water pump. The resulting configuration improves the assembling of the actuator cover of the belt continuously variable transmission apparatus.

3 Claims, 12 Drawing Sheets

V-BELT TYPE CONTINUOUSLY VARIABLE TRANSMISSION

CROSS-REFERENCE TO RELATED APPLICATION

The present application is related to Japanese Patent Application No. 2003-342367 filed on Sep. 30, 2003, and Japanese Patent Application No. 2003-352965 filed on Oct. 10, 2003, the entire contents of which are hereby incorporated by reference.

BACKGROUND OF THE INVENTION

1. Field of the Invention

This invention relates to a belt-type continuously variable transmission apparatus, and more particularly to a V-belt continuously variable transmission apparatus wherein the transmission gear ratio can be controlled by an electric actuator.

2. Description of Background Art

A V-belt continuously variable transmission apparatus is known wherein a V-belt extends between and around a driving pulley connected to a prime mover such as an engine and a driven pulley connected to a load and the wrapping diameters of the V-belt on the driving pulley and the driven pulley are varied continuously to control the transmission gear ratio. In order to vary the wrapping diameters of the V-belt, from between a fixed pulley part and a movable pulley part which form each of the driving pulley and the driven pulley, the movable pulley part is displaced in an axial direction of a support shaft therefor to vary the distance between the pulley parts to vary the wrapping diameter.

For example, a continuously variable transmission apparatus wherein a movable pulley part is driven by a motor is disclosed in Japanese Patent Laid-Open No. Hei 5-44827. In the continuously variable transmission apparatus, the movable pulley part of the driving pulley is coupled to a slider through a bearing and the slider is connected to a motor through a gear.

The control of the transmission gear ratio is performed detecting an operation condition of the engine from the speed of rotation of the engine, the throttle opening and so forth. Whether the transmission gear ratio has an appropriate value is detected as the position of the movable pulley part, and the motor is feedback controlled based on the detected position of the movable pulley part.

The continuously variable transmission apparatus mentioned above includes: a power transmission case formed integrally with a crankcase of an engine and forming a partition wall from a crankcase, a power transmission case cover for covering the power transmission case, and an outer cover for covering the power transmission case cover. Since the outer cover closes up air circulating holes for cooling and so forth and is formed attaching importance to the appearance design, the transmission apparatus is protected substantially by the power transmission case and the power transmission case cover. Accordingly, a transmission apparatus wherein a slider is connected to a motor through a gear system and is moved by the motor to control the transmission gear ratio is configured such that they are covered with a power transmission case cover.

However, in order to form the power transmission case cover in such a manner as to cover the gear system and the motor, a complicated configuration must be formed integrally. To this end, the mold for manufacture is obliged to be complicated, and also assembly to the power transmission case is not easy.

SUMMARY AND OBJECTS OF THE INVENTION

Taking the problems of the prior art described above into consideration, it is an object of the present invention to provide a V-belt continuously variable transmission apparatus by which, where a motor and a gear system for adjustment of the transmission gear ratio are provided, a power transmission case is simplified in configuration and also a motor, a gear system and a cover can be simplified.

According to a first aspect of the present invention, a V-belt continuously variable transmission apparatus includes a driving pulley driven by an engine and a driven pulley for being driven by the driving pulley through a V-belt. Each of the pulleys includes a fixed part fixed to a support shaft therefor and a movable part provided for sliding movement in an axial direction with respect to the support shaft, and the movable part of the driving pulley is displaced in the axial direction by a motor to vary the distance between the fixed part and the movable part and the movable part of the driven pulley is slidably moved in response to the variation of the distance thereby to vary the speed of rotation of the driven pulley with respect to the driving pulley. The V-belt continuously variable transmission apparatus has a first characteristic that includes a gear system for transmitting power of the motor to the movable part of the driving pulley, a power transmission case for accommodating the driving pulley, the driven pulley and the gear system therein, a power transmission case cover coupled to the power transmission case for covering the driving pulley and the driven pulley, and an actuator cover coupled to the power transmission case for covering the gear system, and that the motor is supported on the actuator cover.

Further, according to a second aspect of the invention, the actuator cover and the power transmission case of the V-belt continuously variable transmission apparatus cooperatively form a wall face of a water pump for circulating water to the engine.

Furthermore, according to a third aspect the present invention, the V-belt continuously variable transmission apparatus is used for an engine having a cylinder projecting forwardly of a vehicle, and the gear system and the motor are provided on the projecting direction side of the cylinder with respect to the driving pulley.

According to a fourth aspect of the invention, a scooter type vehicle includes passenger steps provided at rear portions of step floors disposed on the opposite sides of a vehicle body, a variable transmission interposed between an engine and a rear wheel having a transmission ratio that is varied in response to operation of an actuator, wherein the actuator is disposed downwardly of the passenger steps.

According to a fifth aspect of the invention, the variable transmission of the scooter type vehicle is a belt type transmission. The variable transmission cooperates with the engine, which has a cylinder having a substantially horizontal axis, to form a unit swing engine, and the actuator is disposed forwardly of the variable transmission sidewardly of the cylinder.

According to a sixth aspect of the invention, a vehicle body frame of the scooter type vehicle is provided with a support frame for supporting the step floors from below, and the actuator is disposed downwardly of the support frame.

According to a seventh aspect of the invention, the actuator of the scooter type vehicle is an electric motor having an axis of rotation directed in a vehicle body widthwise direction.

As a result of the first aspect of the invention as described above, the actuator cover which covers the motor and the gear system for driving the driving part of the driving pulley of the transmission apparatus is formed as a separate member from the power transmission case cover which covers the belt apparatus which is the body of the transmission apparatus. Accordingly, manufacture of molds for use for manufacture of the covers is facilitated, and also the workability when the covers are assembled to or disassembled from the power transmission case is good.

According to the second aspect of the invention, since also the water pump can be covered simultaneously, the maintenance is easy.

According to the third aspect of the invention, in the engine wherein the cylinder projects, the motor and the gear system can be performed layout so as to be positioned in the proximity of the projecting portion of the cylinder. In other words, the actuator means of the transmission apparatus can be performed layout without allowing creation of a surplus projecting portion.

According to the fourth aspect of the invention, the disposition of the actuator at a position lower than the passenger steps contributes to making the center of gravity of the scooter type vehicle at a lower position.

According to the fifth aspect of the invention, the actuator can be protected by the cylinder of the engine and the variable transmission.

According to the sixth aspect of the invention, the actuator can be protected further effectively by the support frame of a high rigidity.

Further, according to the seventh aspect of the invention, the actuator can be disposed sidewardly of the cylinder of the engine such that it does not project outwardly sidewardly from the outer side surface of the variable transmission.

However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 3:
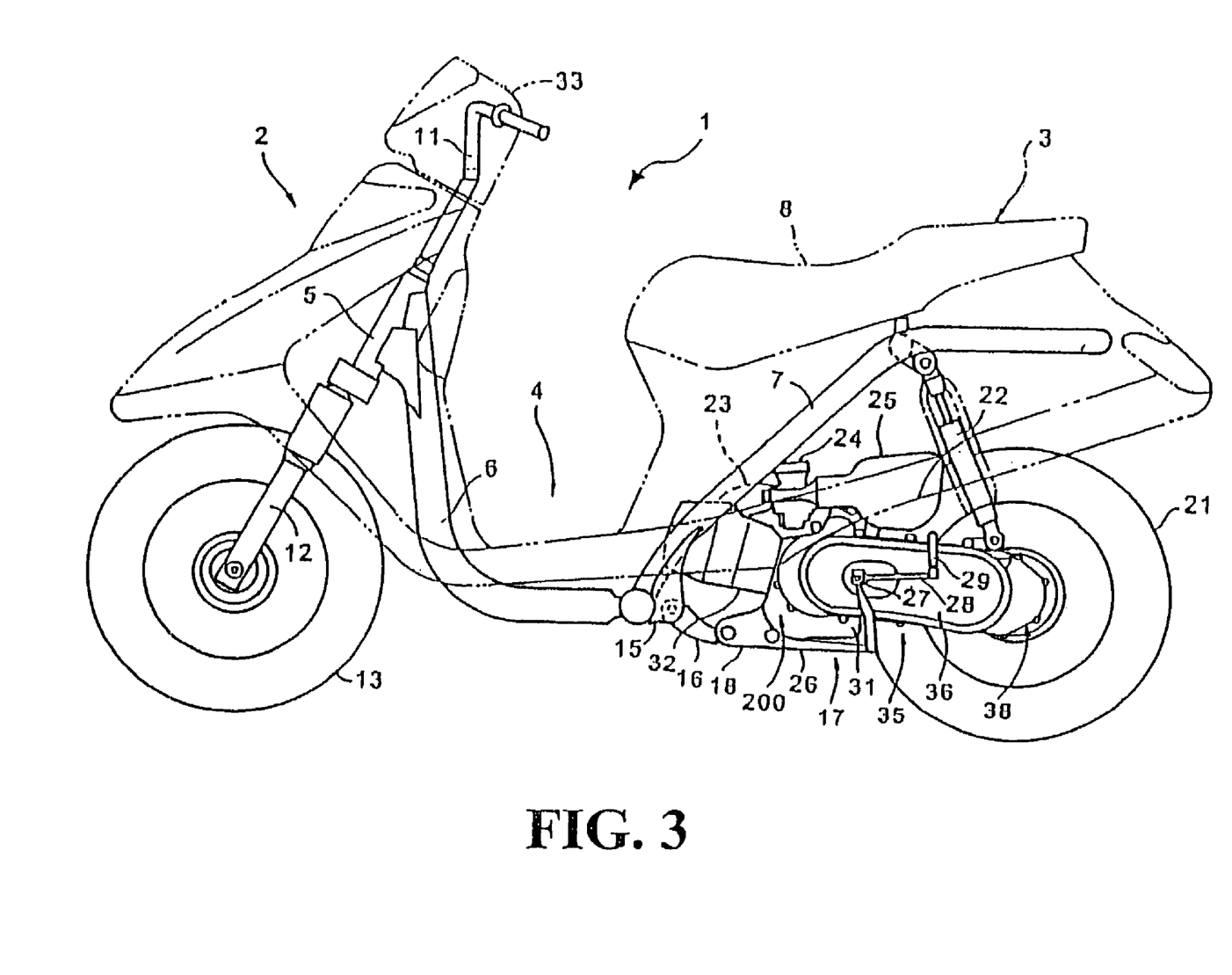
FIG. 3 is a side elevational view of a motorcycle according to the first embodiment of the present invention.

In the following, an embodiment of the present invention is described with reference to the drawings. FIG. 3 is a side elevational view of an appearance of a scooter type motorcycle with a continuously variable transmission according to an embodiment of the present invention. Referring to FIG. 3, a vehicle body front portion 2 and a vehicle body rear portion 3 of a scooter type motorcycle 1 are connected to each other through a floor portion 4. The skeleton of the vehicle body is formed from a down tube 6 and a main tube 7 extending rearwardly upwardly from the down tube 6. A seat 8 is disposed above the main tube 7. An accommodation box for a helmet and a fuel tank (both not shown) are provided between the seat 8 and the main tube 7. The seat 8 serves also as a lid for the accommodation box.

The down tube 6 is joined at a front end thereto to a head pipe 5 provided on the vehicle body front portion 2. A front fork 12 is supported for pivotal motion on the head pipe 5. A handle bar 11 is attached to an upper extension of the front fork 12 while a front wheel 13 is supported for rotation at a lower end of the front fork 12. An upper portion of the handle bar 11 is covered with a handle bar cover 33 which serves also as an instrument panel.

A bracket 15 is provided at a lower end of an uprightly extending portion of the main tube 7, and a hanger bracket 18 is connected to the bracket 15 through a link member 16 and a swing unit 17 is supported for rocking motion on the bracket 15. A rear portion of the swing unit 17 and a rear portion of the main tube 7 are connected to each other by a suspension 22 having a shock absorbing member. A single-cylinder 4-cycle engine 200 is carried at a front portion of the swing unit 17. A V-belt continuously variable transmission 35 and a reduction gear 38 are provided rearwardly of the engine 200. A rear wheel 21 is coupled to an output power shaft (hereinafter described) of the reduction gear 38. In other words, the output power of the engine 200 is transmitted to the rear wheel 21 through the continuously variable transmission 35 and the reduction gear 38.

An intake pipe 23 extends from a cylinder head 32 of the engine 200 is connected to a front portion of the swing unit 17. A carburetor 24 and an air cleaner 25 connected to the carburetor 24 are disposed on the intake pipe 23. A main stand 26 for parking is supported on the hanger bracket 18 provided on a crankcase 31 of the swing unit 17. A kick shaft 27 projects from an outer cover 36 of the transmission 35, and a kick arm 28 is secured to the kick shaft 27. A kick pedal 29 is provided at an end of the kick arm 28.

Figure 1:
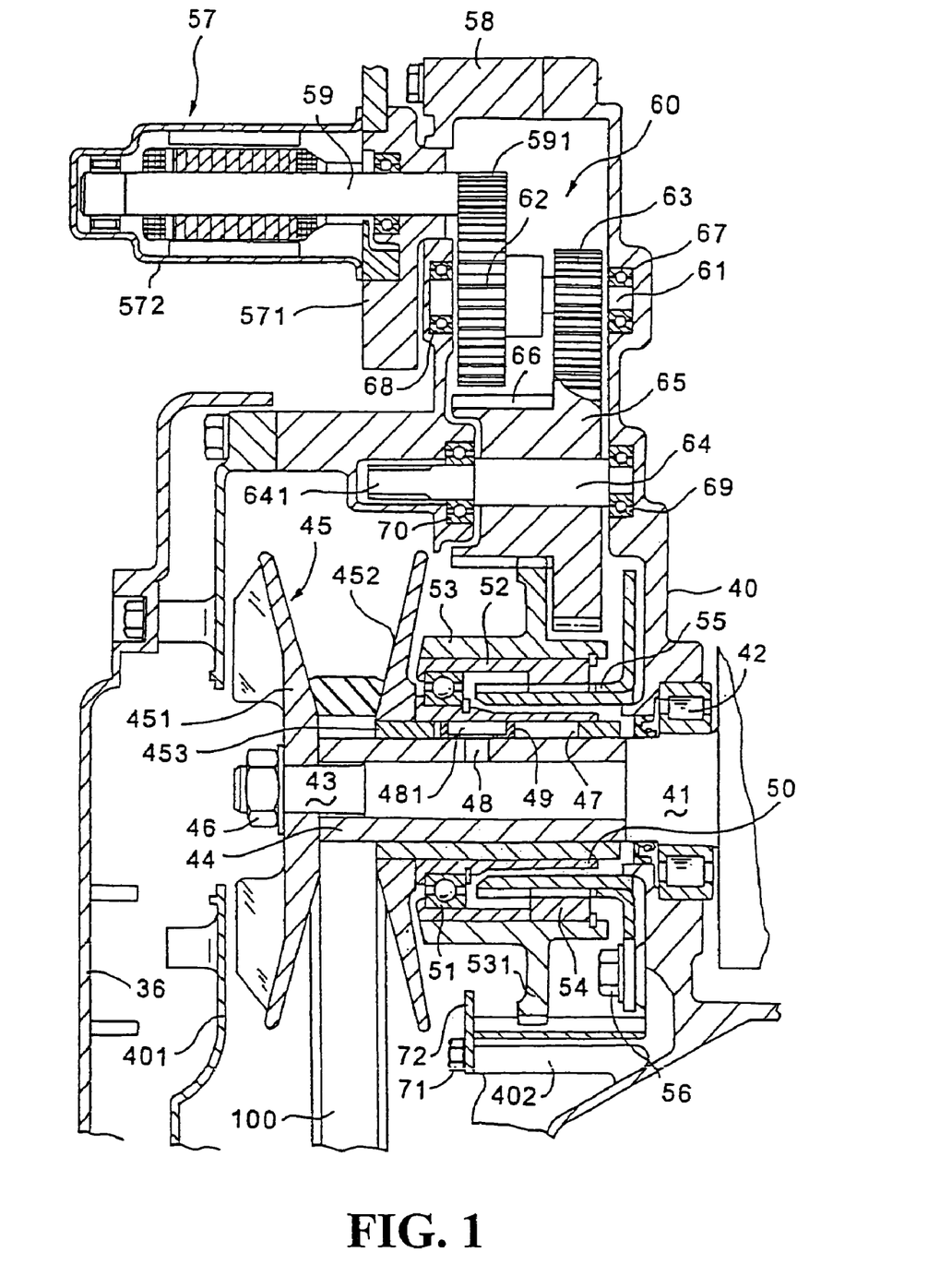
FIG. 1 is a sectional view of a front portion of a belt type continuously variable transmission apparatus according to a first embodiment of the present invention.
Figure 2:
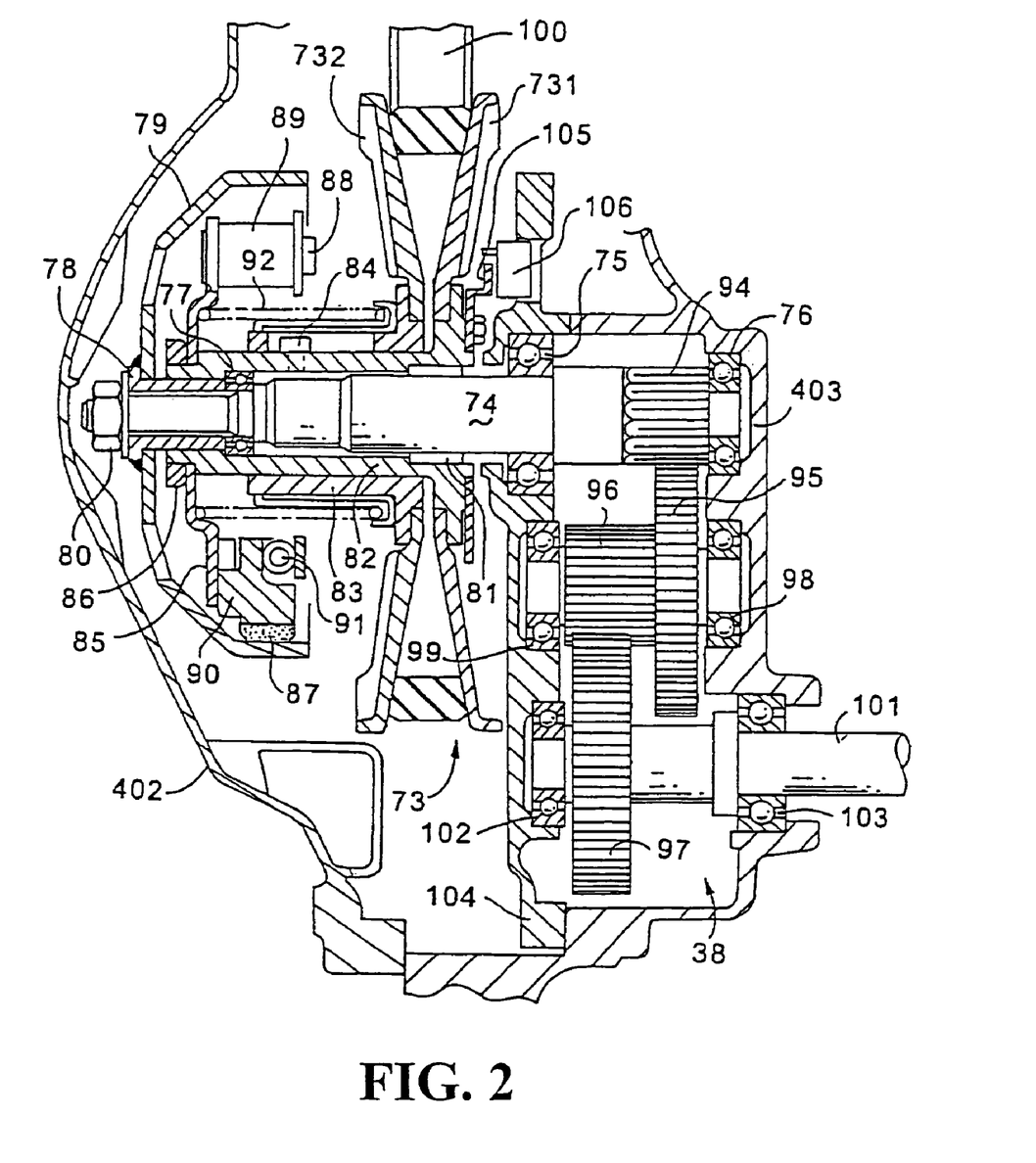
FIG. 2 is a sectional view of a rear portion of the belt type continuously variable transmission apparatus according to the first embodiment of the present invention.

FIG. 1 is a sectional view of a front portion of the continuously variable transmission and FIG. 2 is a sectional view of a rear portion of the continuously variable transmission. Referring to FIGS. 1 and 2, the continuously variable transmission has an outer profile formed from a power transmission case 40, a power transmission case cover 401, an outer cover 36 and a actuator cover 58. The power transmission case 40 is part of the crankcase 31 of the engine 200. The power transmission case cover 401 covers the power transmission case 40 from the left side of the vehicle while the outer cover 36 further covers the power transmission case cover 401. The actuator cover 58 is assembled to a front portion of the power transmission case cover 401 (a front portion in the traveling direction of the vehicle) and covers a motor 57 as an actuator for driving the transmission and a gear system 60.

Referring to FIG. 1, a crankshaft 41 of the engine 200 is supported by a bearing 42 provided on the power transmission case 40 and another bearing not shown. A portion 43 of the crankshaft 41 which projects to the outside from the power transmission case 40 is a support shaft for a driving pulley 45 and is a driving shaft of the continuously variable transmission.

A guide pipe 44 is mounted on an outer periphery of the portion (a driving shaft) 43. The driving pulley 45 includes a fixed pulley part 451 provided at an end of the driving shaft 43 and a movable pulley part 452 movable in an axial direction of the driving shaft 43. A V-belt 100 extends around and between the driving pulley 45 and a driven pulley hereinafter described. The fixed pulley part 451 is secured to the driving shaft 43 by means of a nut 46 screwed on a threaded portion provided at the end of the driving shaft 43. A hub 453 of the movable pulley part 452 is fitted for sliding movement on an outer periphery of the guide pipe 44 so that the movable pulley part 452 can be moved in the direction of the driving shaft.

An elongated hole or guide hole 47 elongated in the axial direction of the driving shaft 43 is formed in the hub 453 of the movable pulley part 452. A guide pin 48 is provided uprightly on the outer periphery of the guide pipe 44, and a head portion 481 of the guide pin 48 projects into the guide hole 47. A collar 49 of a fluorocarbon resin having a low coefficient of friction is provided on the head portion of the guide pin 48 such that it covers at least a portion of the head portion which is opposed to the inner face of the guide hole 47. Preferably, also a portion of the head portion of the guide pin 48 which is opposed to the outer periphery of the guide pipe 44 is covered with the collar 49 as shown in the figure. Consequently, the movable pulley part 452 to which the hub 453 is secured is restricted from being displaced in the direction of rotation with respect to the guide pipe 44 and hence to the driving shaft 43 by the guide pin 48 but is movable only in the axial direction with respect to the driving shaft 43. Since the guide pin 48 slidably moves in the guide hole 47 of the hub 453 with the collar 49 interposed therebetween, the movement of the movable pulley part 452 is smooth and also generation of sliding noise is suppressed.

A bearing holding ring 50 is fitted on an outer periphery of the hub 453 of the movable pulley part 452, and an inner race of a bearing 51 is fitted on an outer periphery of the bearing holding ring 50. A retaining ring 52 for a slider is fitted on an outer race of the bearing 51, and a slider 53 is fitted on the retaining ring 52. The slider 53 has a cylindrical shape and has a gear wheel 531 on the outer side thereof while a feed ring 54 is fitted on the inner side of the slider 53. The feed ring 54 has a female thread (screw thread) formed on an inner circumference thereof. The female thread of the feed ring 54 meshes with a male thread (screw thread) formed on an outer periphery of a tubular member 55. The tubular member 55 is secured to the power transmission case 40 by means of a bolt 56 through a flange portion welded to an outer periphery thereof Now, a driving section for transmitting the power to the gear wheel 531 of the slider 53 is described. The driving section for driving the gear wheel 531 of the slider 53 includes a gear system 60 and a motor 57. The motor 57 includes a base plate 571 and a housing 572. The base plate 571 is fitted in and secured to the actuator cover 58 of the power transmission case 40. An output power gear 591 is formed at an end of a motor shaft 59.

The gear system 60 includes first stepped gear wheels 62 and 63 secured to a common shaft 61 and second stepped gear wheels 65 and 66 secured to another common shaft 64. The gear wheels of the gear system 60 are preferably made of resin in order to reduce the operation noise. The shaft 61 of the first stepped gear wheels is supported by a bearing 67 provided on the power transmission case 40 and another bearing 68 provided on the actuator cover 58. Meanwhile, the shaft 64 of the second stepped gear wheels is supported by a bearing 69 provided on the power transmission case 40 and another bearing 70 provided on the actuator cover 58. The large gear wheel 62 from between the first stepped gear wheels meshes with the output power gear 591 while the small gear wheel 63 meshes with the large gear wheel 65 from between the second stepped gear wheels. The small gear wheel 66 from between the second gear wheels meshes with the gear wheel 531 of the slider 53.

A gear wheel 641 is formed on an extension of the shaft 64 for the second stepped gear wheels which extends through the bearing 70. The gear wheel 641 is a worm gear. This worm gear 641 meshes with a worm wheel connected to a rotary variable resistor or a rotary potentiometer as a rotation sensor (the rotation sensor and the worm wheel are hereinafter described). Thus, the shaft 64 has a function as a sensor output shaft for transmitting the amount of rotation of the gear system 60 to the rotation sensor.

A rib 402 is formed on the power transmission case 40 such that it surrounds an outer periphery of the gear wheel 531 formed on the slider 53, and a regulation plate 72 is attached to an end portion of the rib 402 by means of a bolt 71. A limit to movement of the slider 53 to the driving pulley 45 side is defined by a regulation plate 72. Normally, the gear wheel 531 of the slider 53 moves within a range within which it does not contact with the regulation plate 72.

Through the configuration described above, rotation of the motor 57 is transmitted to the gear wheel 531 of the slider 53 successively through the output power gear 591, first stepped gear wheels 62 and 63 and second stepped gear wheels 65 and 66 to rotate the slider 53. As the slider 53 is rotated, the feed ring 54 rotates around the tubular member 55, and as a result, the slider 53 is relatively screw fed in the axial direction of the crankshaft 41. The direction of the displacement of the slider 53 by the action of the threads depends upon the directions of the female thread and the male thread of the feed ring 54 and the tubular member 55.

As the slider 53 is displaced along the driving shaft 43, the movement is transmitted to the movable pulley part 452 through the bearing 51 to vary the distance between the movable pulley part 452 and the fixed pulley part 451. If the distance between the fixed pulley part 451 and the movable pulley part 452 increases, then the V-belt 100 operates so that the wrapping diameter on the driving pulley 45 decreases together with a movement of the driven pulley hereinafter described. On the other hand, the force in a direction in which the distance between the fixed pulley part 451 and the movable pulley part 452 decreases exerts a component of force to act to force the V-belt 100 in a radially outward direction of the driving pulley 45, and this increases the wrapping diameter of the V-belt 100 together with a movement of the driven pulley hereinafter described.

The position of the slider 53 represents the transmission gear ratio of the transmission. Accordingly, it is possible to detect the position of the slider 53 by means of the rotation sensor described hereinabove for detecting the rotational position of the gear wheel 641 and feed back a result of the detection to the control of the transmission gear ratio.

Now, a configuration of a rear portion of the continuously variable transmission. Referring to FIG. 2, a driven pulley 73 includes a fixed pulley part 731 and a movable pulley part 732. A driven shaft (support shaft for the driven pulley) 74 on which the driven pulley 73 is supported is supported by bearings 75 and 76. A further bearing 77 is fitted on one end side of the driven shaft 74, that is, on an end portion of a left side portion of the driven shaft 74 with respect to the bearing 75, and a collar 78 is fitted on the tip end side of the driven shaft 74 with respect to the bearing 77. A cup-shaped clutch plate 79 is welded to the collar 78. A thread is formed on the end portion of the driven shaft 74, and a nut 80 is screwed on the thread. The collar 78 and the clutch plate 79 are secured to the driven shaft 74 through an inner race of the bearing 77. A bearing 81 is provided on an outer periphery of an intermediate portion of the driven shaft 74, and a hub 82 of the fixed pulley part 731 is mounted on an outer periphery of the driven shaft 74 by means of the bearing 81 and the bearing 77.

Further, a hub 83 of the movable pulley part 732 is provided on an outer periphery of the hub 82 of the fixed pulley part 731. The movable pulley part 732 is slidably movable in the longitudinal direction of the driven shaft 74 with respect to the fixed pulley part 731. A guide pin 84 is provided uprightly on the hub 82. A guide hole 831 provided in the hub 83 engages with a head portion of the guide pin 84 thereby to restrict rotation of the movable pulley part 732 with respect to the hub 83.

A clutch shoe support plate 85 is secured to an end portion of the hub 82 of the fixed pulley part 731 by a nut 86. A clutch shoe 87 is provided on the support plate 85. The clutch shoe 87 is securely mounted on an arm 90 having a boss 89 supported for rotation by a pivot 88 erected uprightly on the support plate 85. The arm 90 is biased in a direction in which the clutch shoe 87 is spaced away from the inner face of the clutch plate 79 by a spring 91. Further, a coil spring 92 is interposed between the movable pulley part 732 and the support plate 85 and biases the movable pulley part 732 toward the fixed pulley part 731 side.

The reduction gear 38 is provided at a rear portion of the continuously variable transmission. The reduction gear 38 includes an input power gear wheel 94, intermediate gear wheels 95 and 96 and a final stepped gear wheel 97. The input power gear wheel 94 is provided at the other end of the driven shaft 74, that is, between the bearings 75 and 76 in FIG. 2. The input power gear wheel 94 meshes with the large gear wheel 95 from between the intermediate gear wheels while the small gear wheel 96 from between the intermediate gear wheels meshes with the final stepped gear wheel 97. Shafts for the intermediate gear wheels 95 and 96 are supported by bearings 98 and 99, and a shaft for the final stepped gear wheel 97, that is, an output power shaft 101, is supported by bearings 102 and 103. The bearings 76, 98 and 103 are fitted in a rear part of a casing 403 which is succeeding part of the rib 402, while the bearings 75, 99 and 102 are fitted in a reduction gear cover 104 secured the casing 403.

A sensor plate 105 is provided on a side face of the hub 82 of the fixed pulley part 731, and a magnetic sensor 106 is provided in an opposing relationship to an outer periphery of the sensor plate 105. The sensor plate 105 is made of iron, and the sensor plate 105 made of iron has one or a plurality of convex or concave portions on an outer periphery thereof Accordingly, the output of the magnetic sensor 106 changes at each shape changing portion, and the speed of rotation of the driven pulley 73 can be detected, for example, from the interval between output changes. The magnetic sensor 106 is secured to the reduction gear cover 104.

Through the configuration described above, if the wrapping diameter of the V-belt increases on the driving pulley 45 side, then the tension of the V-belt 100 increases, and this increase of tension exerts force to tend to increase the distance between the movable pulley part 732 and the fixed pulley part 731 of the driven pulley 73. As a result, on the driven side, the wrapping diameter of the V-belt 100 decreases. In other words, the reduction gear ratio decreases. On the other hand, if the wrapping diameter of the V-belt decreases on the driving pulley 45 side, then the tension of the V-belt 100 decreases. Thus, if the biasing force of the coil spring 92 exceeds the component of force of the tension applied to the V-belt 100 as a result of the decrease of the tension, then force to tend to decrease the distance between the movable pulley part 732 and the fixed pulley part 731 of the driven pulley 73 is exerted. As a result, the wrapping diameter of the V-belt 100 increases on the driven side. In other words, the reduction gear ratio increases.

When the speed of rotation of the driven pulley 73 becomes equal to a predetermined value, the clutch shoe 87 is brought into contact with the clutch plate 79 as a result of increase of the centrifugal force. Consequently, the driven shaft 74 coupled to the clutch plate 79 is rotated and in turn rotates the output power shaft 101 through the input power gear wheel 94, intermediate gear wheels 95 and 96 and final stepped gear wheel 97. The rotation of the output power shaft 101 is transmitted to the rear wheel 21 thereby to allow the motorcycle to travel.

Figure 4:
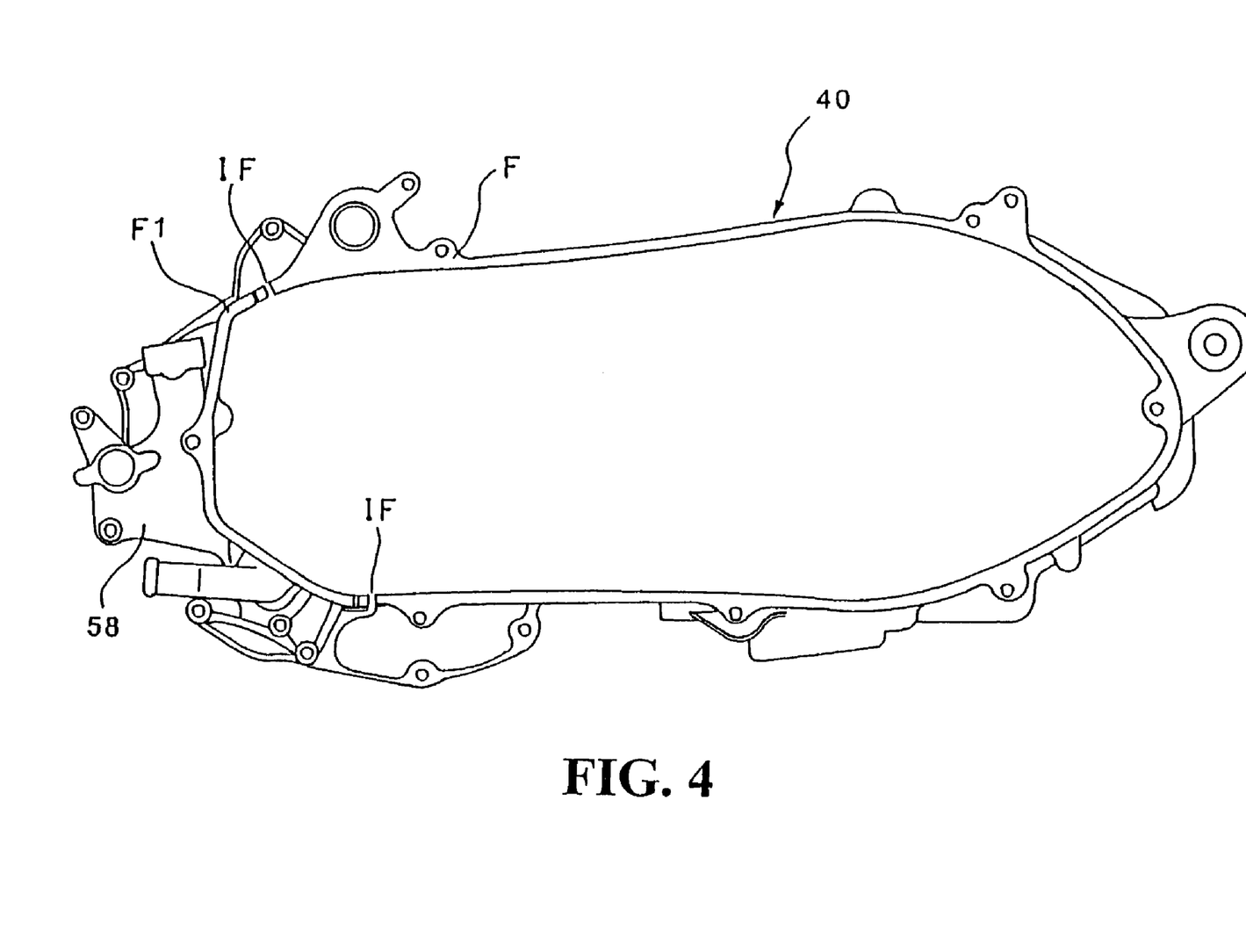
FIG. 4 is a front elevational view of a power transmission case and an actuator cover.

FIG. 4 is a view of the power transmission case 40 and the actuator cover 58 as viewed from the left side of the vehicle body. Referring to FIG. 4, the power transmission case 40 and the actuator cover 58 mate with each other along an mating portion IF. The mating portion IF includes a seal (hereinafter described) provided thereon for sealing the mating portion IF liquid-tight. As hereinafter described in detail, the mating portion IF is formed from a plane perpendicular to a plane parallel to the plane of the figure. Portions F and F1 of the power transmission case 40 and the actuator cover 58 are formed as a coplanar face, and the power transmission case cover 401 is attached to the portions, that is, on the coplanar face.

Figure 5:
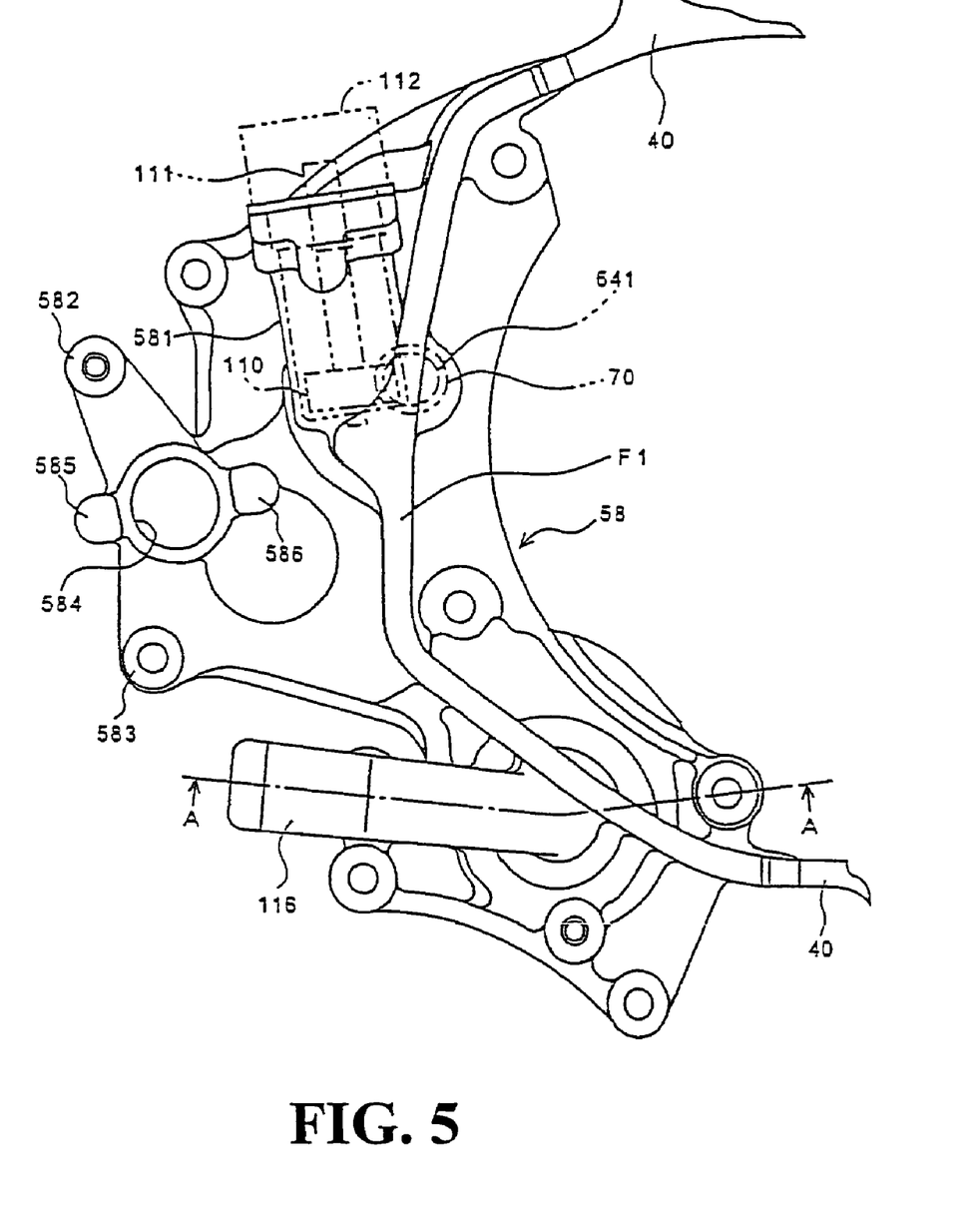
FIG. 5 is a front elevational view of a gear unit cover provided at the front portion of the continuously variable transmission apparatus.
Figure 6:
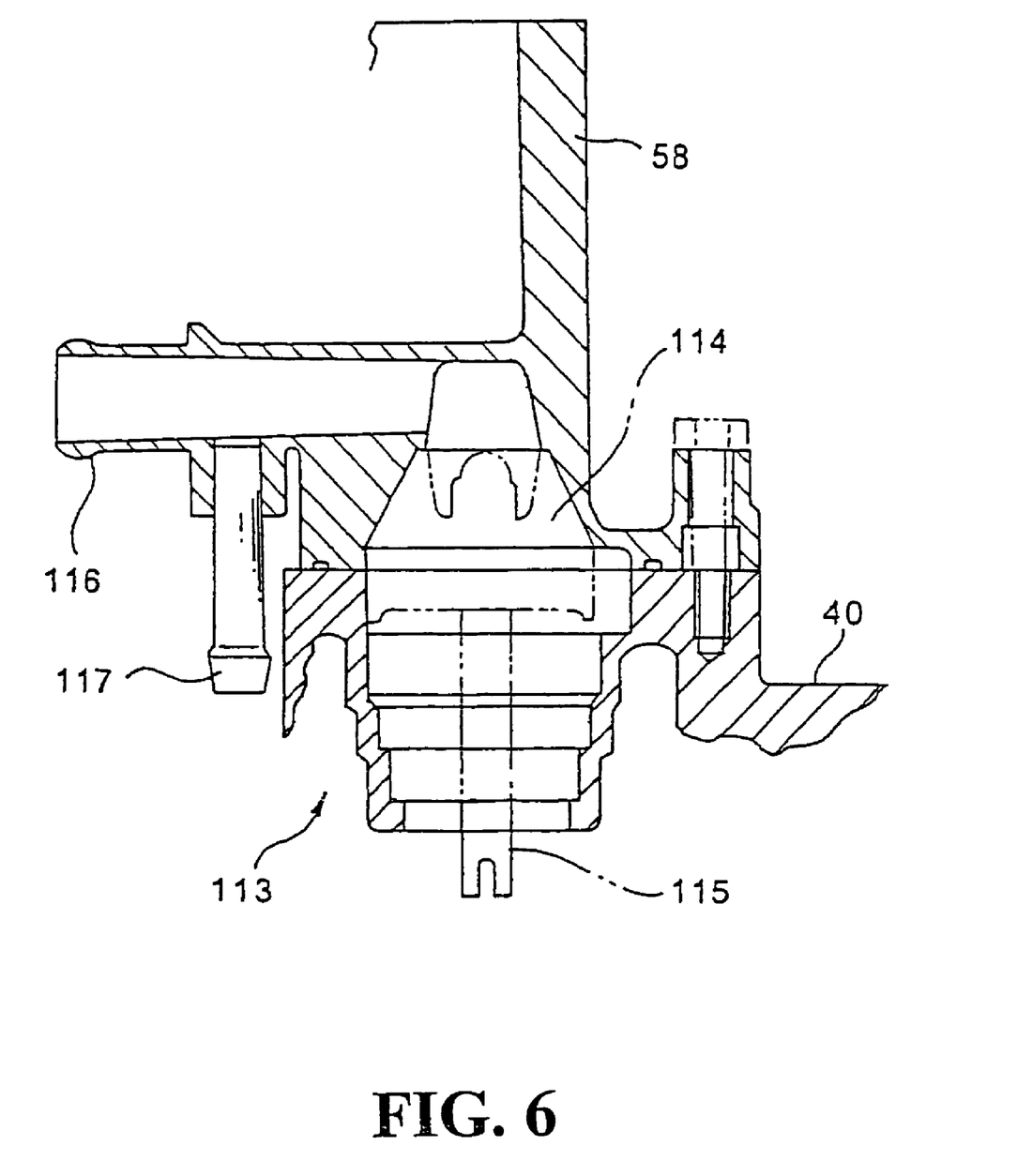
FIG. 6 is a sectional view showing a wall portion of a water pump formed from the actuator cover and the power transmission case.

FIG. 5 is a front elevational view of the actuator cover 58, and FIG. 6 is a sectional view taken along line A—A of FIG. 5. The actuator cover 58 covers components of the speed reducing system from the motor 57 to the shaft 64 as described above and also serves as a cover for a water pump which circulates cooling water through the engine. Referring to FIG. 5, the actuator cover 58 has a tubular projection 581 formed thereon for accommodating a worm wheel 110 meshing with the gear wheel 641 supported by the bearing 70 fitted in the support plate 85 and a shaft 111 for the worm wheel 110 and supporting the shaft 111. A rotation sensor 112 for detecting the rotational position of the worm wheel 110 is coupled to the shaft 111. A detection output of the rotation sensor 112 is supplied to a control apparatus not shown, and the position of the movable pulley part 452 is detected based on the detection output through the gear wheels 641, 65, 66 and 531 which operate in an interlocking relationship with the worm wheel 110.

The actuator cover 58 has bosses 582 and 583 for retaining the base plate 571 of the motor 57 and seats 585 and 586 provided adjacent a boss hole 584 for receiving a hub of the base plate 571 of the base plate 571.

Furthermore, as can be recognized well from FIG. 6, the actuator cover 58 forms an outer wall of a water pump 113 in cooperation with part of the power transmission case 40. An impeller 114 and a shaft 115 are accommodated in a space surrounded by the outer wall. The shaft 115 is connected to the engine by a power transmission apparatus not shown and driven to rotate by rotation of the engine. A mouth ring 116 is an entrance of cooling water to be circulated from the radiator through a thermostat, and another mouth ring 117 is an entrance of cooling water to be circulated without passing through the radiator. Upon starting of the engine or when the temperature of the cooling water is low, water is let in from the mouth ring 117, but if the cooling water temperature is higher than a predetermined value, water of a reduced temperature is let in from the mouth ring 116 through the radiator.

Figure 7:
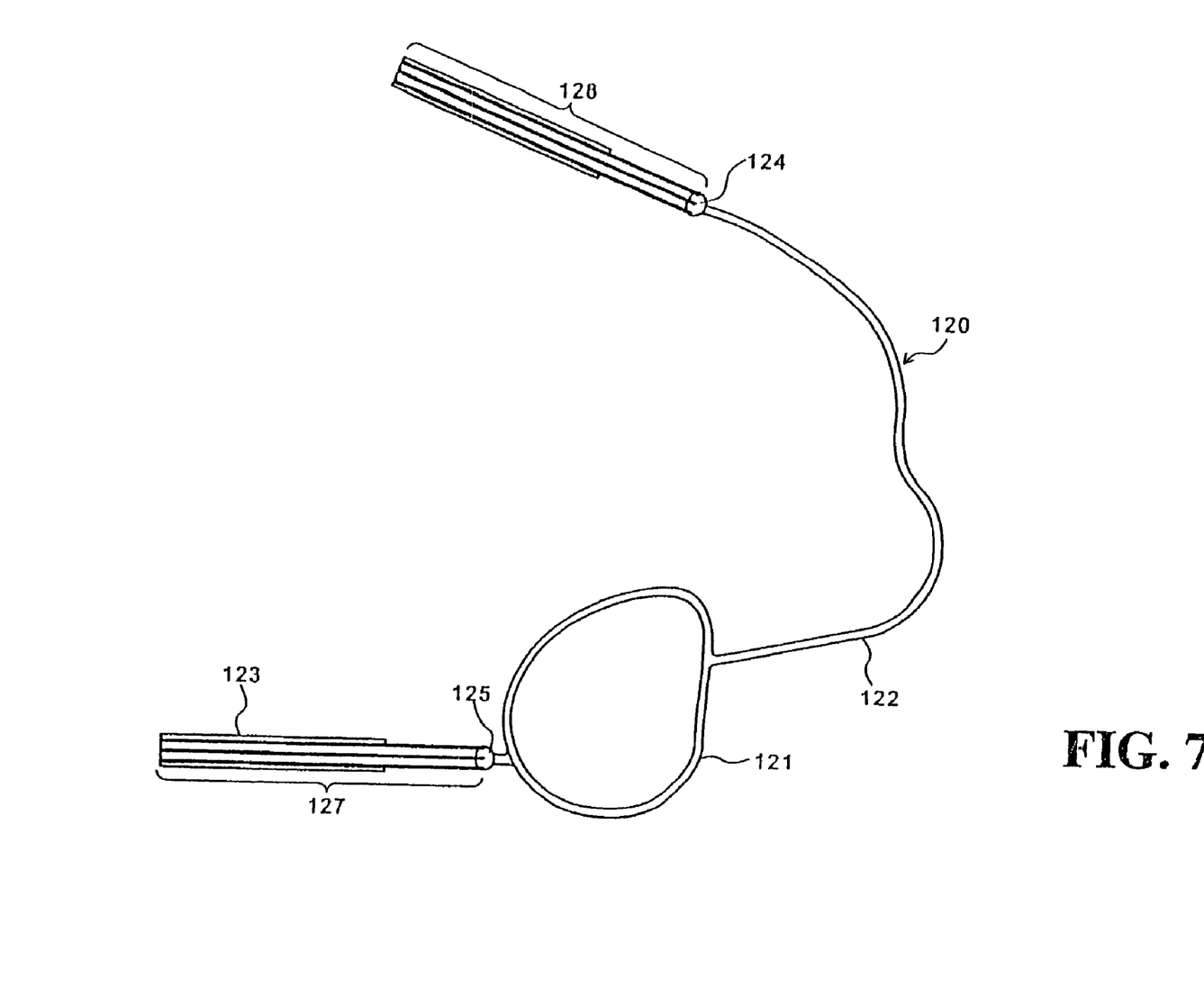
FIG. 7 is a plan view of a seal.
Figure 8:
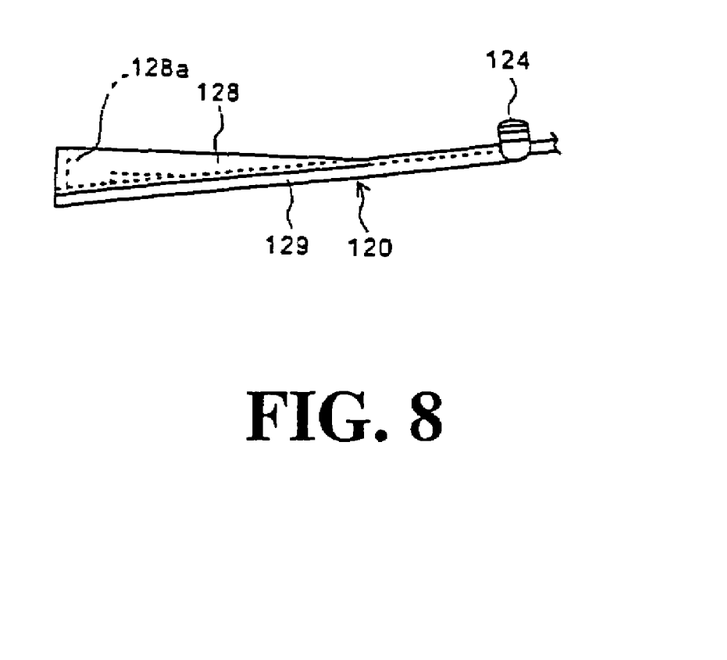
FIG. 8 is a side elevational view of essential part of the seal.
Figure 9:
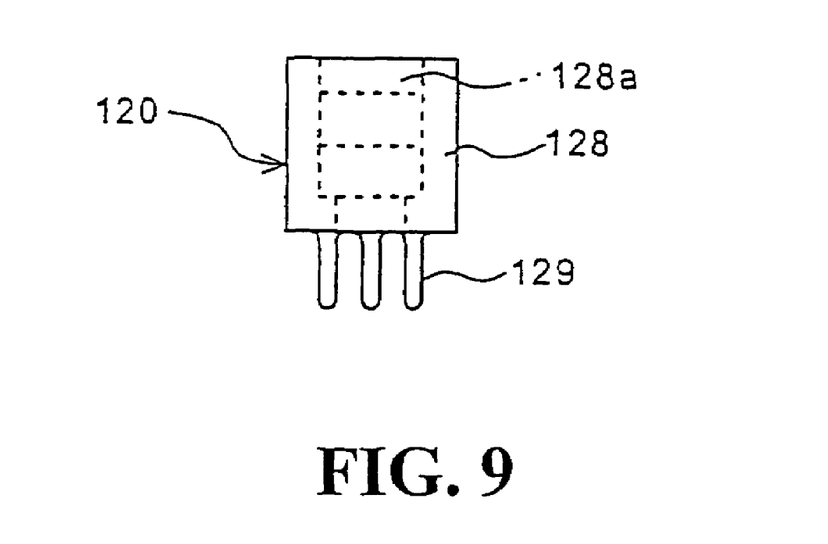
FIG. 9 is an enlarged view of an end portion of the seal.

FIG. 7 is a plan view of a seal disposed between the power transmission case 40 and the actuator cover 58, FIG. 8 is a side elevational view of essential part of the seal, and FIG. 9 is an enlarged view of an end portion of the seal. The seal 120 has an annular portion 121 for sealing the water pump 113 liquid-tight, an elongated portion 122 extending in one direction from the annular portion 121, and another elongated portion 123 extending in the other direction from the annular portion 121. The seal 120 is formed so as to be deflectable in a direction perpendicular to the plane of the figure in order to keep a two-dimensional plane, along which the power transmission case 40 and the actuator cover 58 mate with each other, liquid-tight. In other words, portions 127 and 128 extending from the projections 124 and 125 to the end portion sides and the elongated portion 122 between the projections 124 and 125 are different in shape from each other. In particular, while the portion 122 has a circular cross sectional shape so that it can be fitted in a groove hereinafter described, the portions 127 and 128 on the end portion sides from the projections 124 and 125 have such a three-dimensional shape that they can wrap an end face of the actuator cover 58 therein (refer to FIGS. 8 and 9).

In particular, the end portion of the seal 120 includes a box-shaped portion 128 open along one face thereof so as to cover the end portion of the actuator cover 58, and a portion 129 for coupling the box-shaped portion 128 and the projection 124 to each other. A hook portion 128a is provided at an end of the box-shaped portion 128 and is wrapped in the end face of the actuator cover 58.

Figure 10:
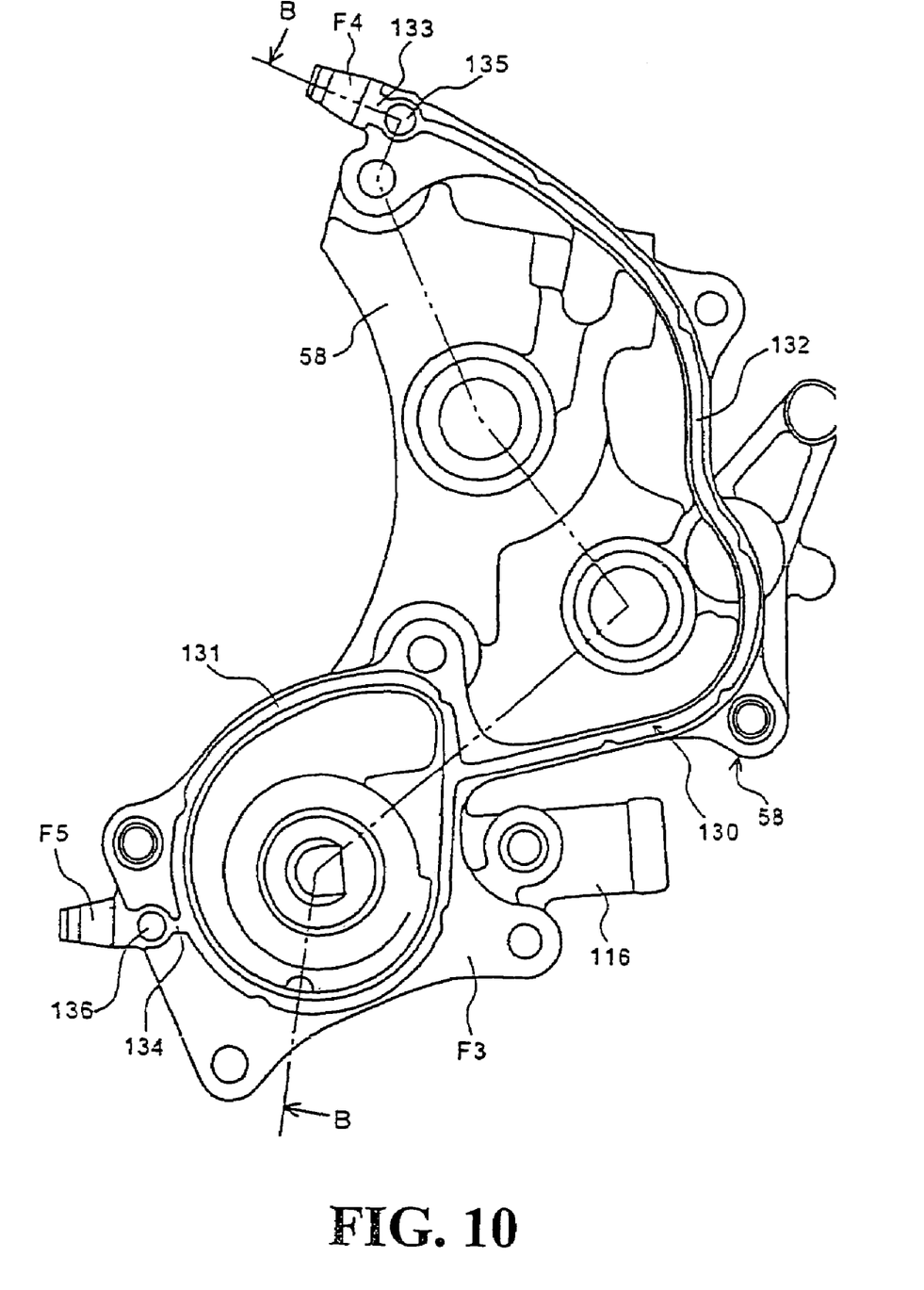
FIG. 10 is a rear elevational view of the actuator cover.
Figure 11:
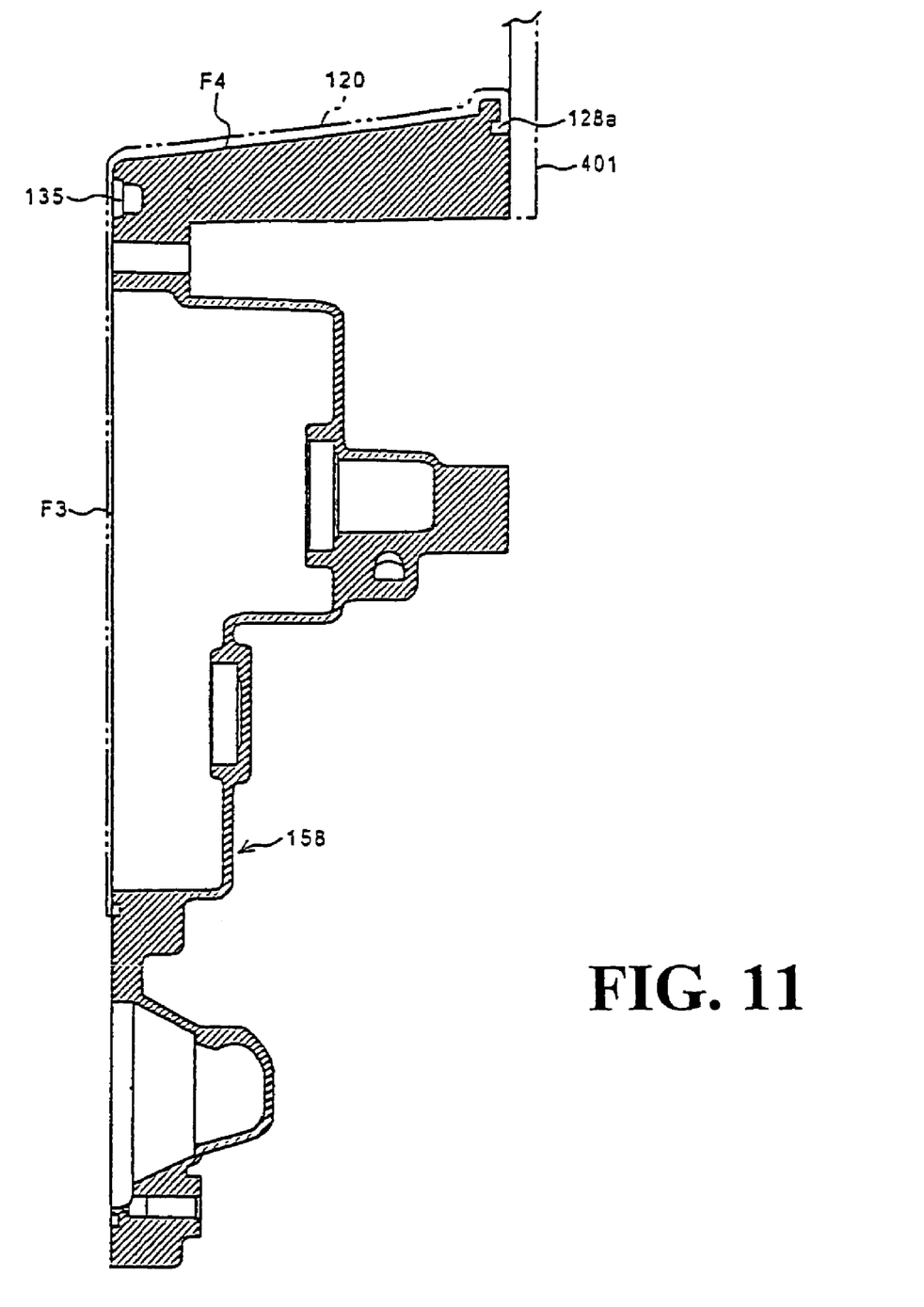
FIG. 11 is a sectional view taken along line B—B of FIG. 10.

FIG. 10 is a rear elevational view of the actuator cover, that is, a view of the actuator cover as viewed from the power transmission case 40 side, and FIG. 11 is a sectional view taken along line B—B of FIG. 10. Referring to FIG. 10, a seal groove 130 for receiving the seal 120 therein is formed substantially along an outer profile of the actuator cover 58. The seal groove 130 has an annular groove 131 for receiving the annular portion 121 of the seal 120 and an elongated groove 132 extending from the annular groove 131. A lead out portion 133 for extending the seal 120 to the outer side from part of the annular groove 131 and another lead out portion 134 for extending the seal 120 to the outer side from the elongated groove 132 are formed. circular recesses 135 and 136 for fixing the seal are provided adjacent the lead out portions 133 and 134, respectively.

Referring to FIGS. 10 and 11, the mating portion between the power transmission case 40 and the actuator cover 58 includes an inclined portion, that is, a face (face parallel to the faces F and F1 described hereinabove) F3 parallel to the forward and rearward direction of the vehicle body and faces F4 and F5 erected uprightly in a vehicle widthwise direction from the face F3. The seal 120 indicated by an imaginary line in FIG. 11 is disposed along the face F3 and faces F4 and F5 and is anchored at the projections 124 and 125 at intermediate portions thereof in the circular recesses 135 and 136, respectively. Further, the hook portion 128a at an end portion of the seal 120 is caught by an end face groove 58a of the actuator cover 58. The hook portion 128a is held down and secured by the power transmission case cover 401.

In this manner, the transmission apparatus of the present embodiment includes, in addition to the seal means for sealing the power transmission case 40 and the power transmission case cover 401 liquid-tight particularly for the dust proofing object, the seal 120 which has an increased sealing function so as to maintain the liquid-tightness. Accordingly, a sealing condition suitable for the water pump can be provided between the actuator cover 58 and the power transmission case 40 which are members for forming a wall face of the water pump.

Figure 12:
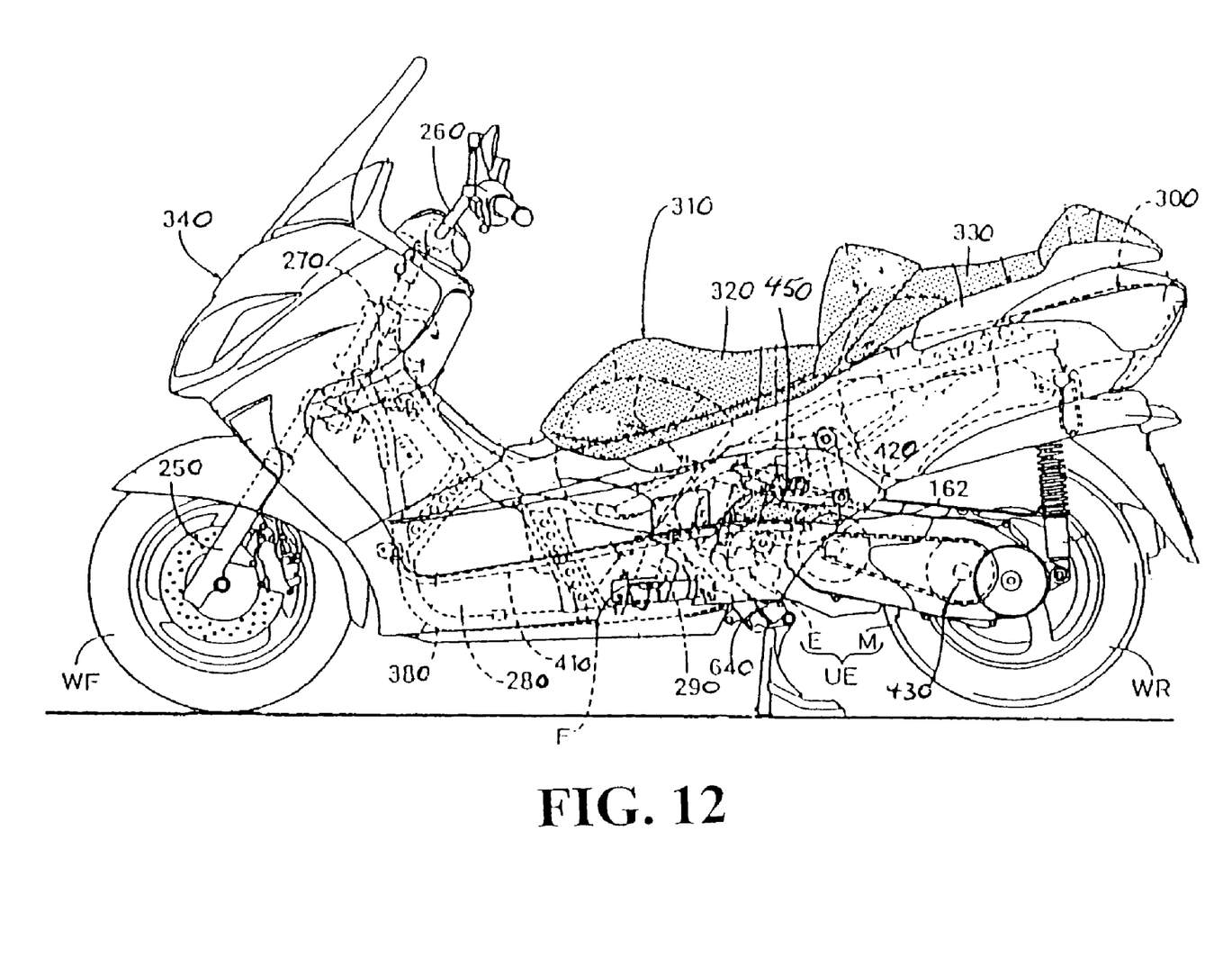
FIG. 12 is a left side elevational view of a scooter according to a second embodiment of the invention.
Figure 13:
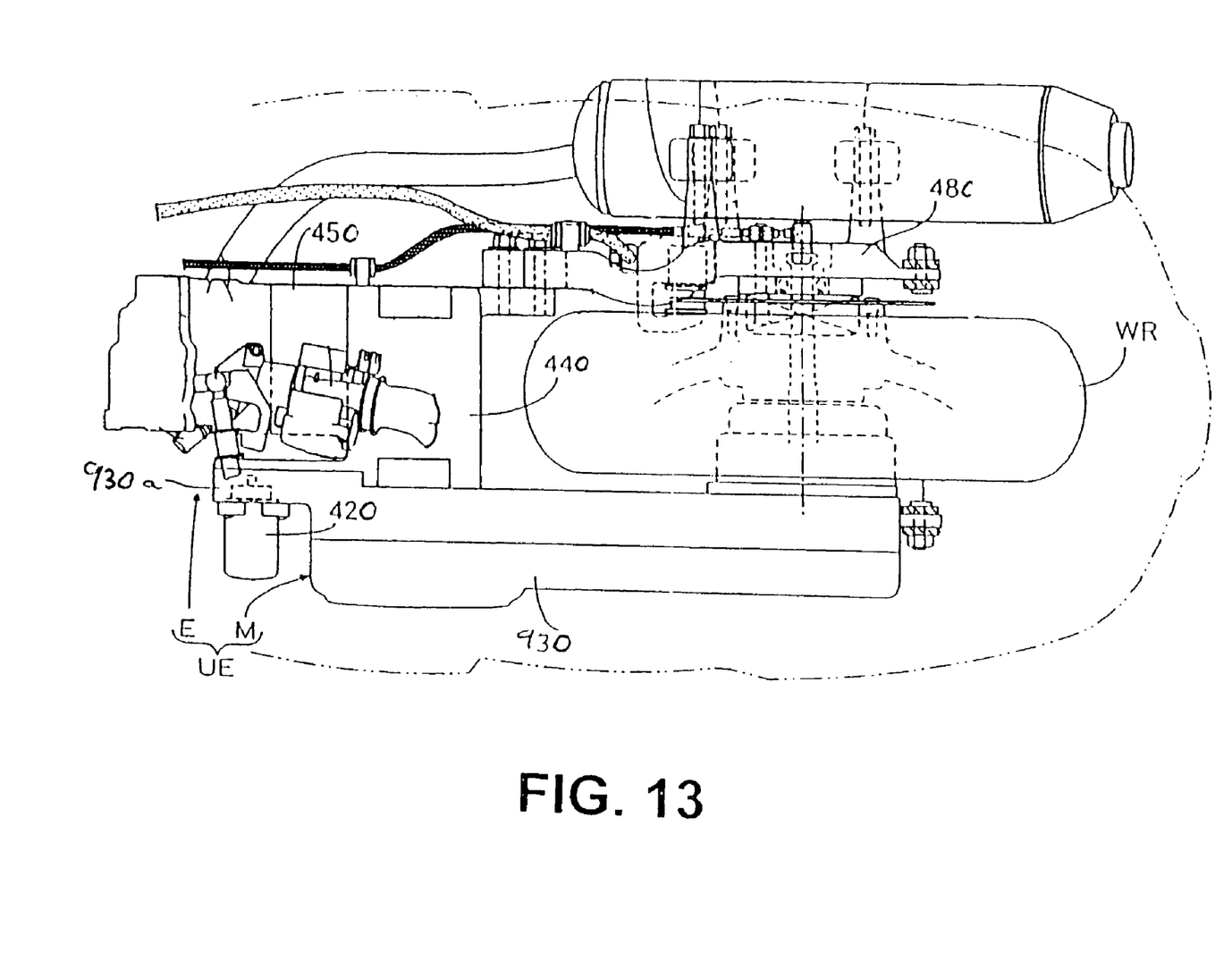
FIG. 13 is a view showing relative arrangement of a unit swing engine, the continuously variable transmission apparatus, and a rear wheel of the scooter shown in FIG. 12.

FIGS. 12 and 13 show a second embodiment of the present invention. In particular, as shown in FIG. 12, a scooter type vehicle in the form of a motorcycle includes a vehicle body frame F, and at a front end thereof, a front fork 250 for supporting a front wheel WF for rotation and a head pipe 270 for supporting a steering handle bar 260 connected to the front fork 250 for steering operation. A unit swing engine UE is supported for upward and downward rocking motion at an intermediate portion of the vehicle body frame F in the forward and rearward direction and supports a rear wheel WR for rotation at a rear end thereof. A fuel tank 280 formed long upwardly and downwardly as viewed in side elevation and a radiator 290 disposed rearwardly of the fuel tank 280 are carried on the vehicle body frame F forwardly of the unit swing engine UE. An accommodation box 300 is attached to the vehicle body frame F such that it covers the unit swing engine UE from above, and a driver's seat 310 of the tandem type is disposed on the accommodation box 300 and has a front seat 320 and a rear seat 330 Further, a vehicle body cover 340 made of synthetic resin is attached to the vehicle body frame F and covers the vehicle body frame F, a front portion of the unit swing engine UE, the radiator 290 and the accommodation box 300.

Referring also to FIG. 13, the unit swing engine UE includes an engine E of the air cooled type having a cylinder axis extending substantially horizontally and a variable transmission M of the belt type including a transmission belt and a pulley for transmitting output power of the engine B at a variably change speed to the rear wheel WR. The variable transmission M drives a movable pulley on the crankshaft side in response to operation of an electric motor 420 as an actuator for the speed change to variably change the transmission gear ratio.

A transmission case 930 of the variable transmission M is provided contiguously to the left side of a crankcase 440 of the engine E such that it is swollen to the left side from the engine E and extends to the left side of the rear wheel WR. A swing arm 480 is coupled at a front end portion thereof to the right side of the crankcase 440, and the rear wheel WR is supported for rotation between a rear end portion of the transmission case 930 and a rear end portion of the swing arm 480.

Incidentally, the electric motor (actuator) 420 for the speed change is disposed leftward and sideward of a cylinder 450 of the engine E forwardly of the variable transmission M and is attached to a forward projection 930a of the transmission case 930 such that an axis of rotation thereof is directed in a vehicle body widthwise direction. Besides, the electric motor 420 is disposed downwardly a left side passenger step 162 from between a pair of left and right passenger steps 162, . . . provided on the vehicle body cover 340 and besides is disposed so as to be positioned, as viewed in side elevation, downwardly of the left side support frame 410 from between the two support frames 410, . . . which form part of the vehicle body frame F.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A V-belt continuously variable transmission apparatus, comprising:
   a driving pulley driven by an engine;
   a driven pulley being driven by said driving pulley through a V-belt,
   wherein each of said pulleys includes a fixed part fixed to a support shaft therefore, and a movable part provided for sliding movement in an axial direction with respect to said support shaft,
   said movable part of said driving pulley being displaced in the axial direction by a motor to vary the distance between said fixed part and said movable part, and
   said movable part of said driven pulley being slidably moved in response to the variation of the distance thereby to vary a speed of rotation of said driven pulley with respect to said driving pulley;
   a gear system for transmitting power of said motor to said movable part of said driving pulley; and
   an actuator cover coupled to a front portion of a power transmission case for covering said gear system,
   wherein said motor is supported on said actuator cover;
   said power transmission case being adapted to accommodate said driving pulley, said driven pulley, and said gear system therein, and
   wherein a power transmission case cover is coupled to said power transmission case for covering said driving pulley and said driven pulley,
   wherein said actuator cover and said power transmission case cooperatively form a wall face of a water pump for circulating water to said engine.

2. A V-belt continuously variable transmission apparatus, comprising:
   a driving pulley driven by an engine;
   a driven pulley being driven by said driving pulley through a V-belt,
   wherein each of said pulleys includes a fixed part fixed to a support shaft therefore, and a movable part provided for sliding movement in an axial direction with respect to said support shaft,
   said movable part of said driving pulley being displaced in the axial direction by a motor to vary the distance between said fixed part and said movable part, and
   said movable part of said driven pulley being slidably moved in response to the variation of the distance thereby to vary a speed of rotation of said driven pulley with respect to said driving pulley;
   a gear system for transmitting power of said motor to said movable part of said driving pulley; and
   an actuator cover coupled to a front portion of a power transmission case for covering said gear system,
   wherein said motor is supported on said actuator cover;
   said power transmission case being adapted to accommodate said driving pulley, said driven pulley, and said gear system therein, and
   wherein a power transmission case cover is coupled to said power transmission case for covering said driving pulley and said driven pulley,
   wherein said actuator cover and said power transmission case cooperatively form a wall face of a water pump for circulating water to said engine,
   wherein said engine includes a cylinder projecting forwardly of a vehicle, and
   said gear system and said motor are provided on a projecting direction side of said cylinder with respect to said driving pulley.

3. A V-belt continuously variable transmission apparatus, comprising:
   a driving pulley driven by an engine;
   a driven pulley being driven by said driving pulley through a V-belt,
   wherein each of said pulleys includes a fixed part fixed to a support shaft therefore, and a movable part provided for sliding movement in an axial direction with respect to said support shaft,
   said movable part of said driving pulley being displaced in the axial direction by a motor to vary the distance between said fixed part and said movable part, and
   said movable part of said driven pulley being slidably moved in response to the variation of the distance thereby to vary a speed of rotation of said driven pulley with respect to said driving pulley;
   a gear system for transmitting power of said motor to said movable part of said driving pulley; and
   an actuator cover coupled to a front portion of a power transmission case for covering said gear system,
   wherein said motor is supported on said actuator cover;
   said power transmission case being adapted to accommodate said driving pulley, said driven pulley, and said gear system therein, and
   wherein a power transmission case cover is coupled to said power transmission case for covering said driving pulley and said driven pulley,
   the V-belt continuously variable transmission apparatus further comprising:
   a seal disposed between the power transmission case and the actuator cover,
   wherein the seal has an annular portion for sealing a water pump in a liquid-tight manner, an elongated portion extending in one direction from the annular portion, and another elongated portion extending in another direction from the annular portion.

* * * * *